United States Patent Office 2,945,176
Patented July 12, 1960

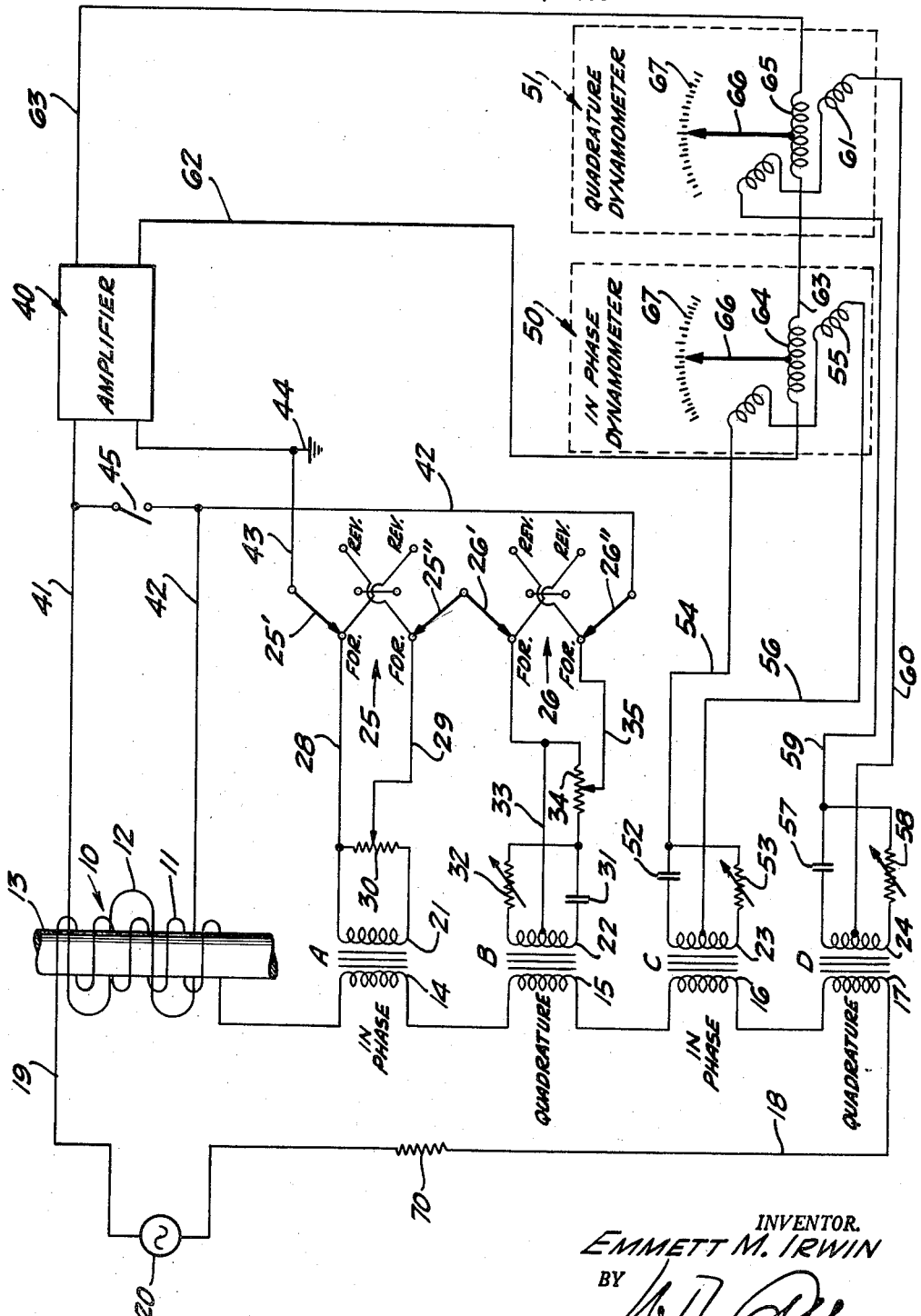

2,945,176
INDUCED FLUX METHOD AND APPARATUS FOR TESTING METALS

Emmett M. Irwin, 2179 Lorain Road, San Marino, Calif.

Filed Oct. 2, 1956, Ser. No. 613,462

12 Claims. (Cl. 324—34)

This invention relates to electrical analyzers and more particularly to a new and improved analyzer apparatus utilizing the induced flux method for the non-destructive testing of metals to determine their physical properties with greater accuracy than is possible with equipment heretofore proposed. In the apparatus of the present invention the voltage measurements are always accurately related to the phase of the current flowing through the test coil unit.

In the induced flux method of testing metal materials, a specimen is brought into inductive relationship to a test coil energized with a cyclically varying flux field from an alternating current source. This energizing flux field creates a cyclically varying flux field within the specimen having characteristics reflecting the physical conditions and properties of the specimen. This latter field is then brought into inductive relationship to the secondary coil of the test coil unit to induce a voltage therein for analysis by comparison with voltages obtained from a specimen of known properties. In making this comparison, it is customary to place the specimen of known physical properties in the test coil and to oppose the voltage induced in its secondary coil with an equal and opposite voltage so that the net output voltage of the secondary coil is substantially zero. The specimen of known properties is then replaced with a specimen of unknown properties in order that comparative voltage readings can be taken showing the extent to which the net secondary voltage varies with respect to reading obtained with the knownt specimen. If he physical characteristics of the unknown specimen differ from those of the known specimen, the net induced voltage will no longer be zero and the magnitude as well as the phase of these voltage variations as accurately determined by an electrical analyzer will be characteristic of the difference in properties between the two specimens. An electrical analyzer of the type heretofore used for this purpose is shown in Patent 2,673,613, issued to Emmett M. Irwin on March 30, 1954.

According to prior practice, the analysis of the net voltage variations obtained from the secondary of the test coil have been impressed on the movable coils of dynamometers having their field coils excited by currents accurately related in phase to the voltage of the power source for the test coil. By means of separate phase shifters the exciting current for one dynamometer has been adjusted until in phase with the power supply voltage, and that for the second dynamometer similarly adjusted until in quadrature with the supply voltage. The two analyzing instruments will therefore respond to variations in the in-phase and quadrature-phase components, respectively, of changes in the net induced voltage. Changes in the in-phase voltage component represent power losses in the specimen and changes in quadrature voltage component represent changes in the magnetic properties of the specimen. Heretofore, the determination of the phase angles of the currents flowing in the stationary coils of the two dynamometers relative to that flowing in the test coil has been made by means of a phase shifter while a calibrated specimen was located in the test coil unit. Once the desired phase relations of the exciting currents for the two dynamometers has been obtained by means of the phase shifter, no further phase adjustments are made and tests have proceeded after replacing the calibrated specimen with an unknown specimen.

The above-described method of testing metal specimens for physical properties does not provide accurate results in all instances for the reason that the replacement of the calibrated specimen with a test specimen having different properties changes the inductance of the test coil and effects a change in the phase angle of the current through the test coil with respect to the supply voltage. Since the dynamometer power supply is related to the voltage in the test coil rather than to the current through the coil, the phase measurement is in error. This is not particularly serious with respect to those properties disclosed by the quadrature component of the current. However, the slightest shift in the in-phase component of the current can lead to serious errors. Additionally, a shift in the quadrature phase relationship can cause an erroneous indication of the in-phase component. As a consequence, materials have been tested in the past and approved for further service when, in fact, they should have been condemned.

The present invention obviates the foregoing and other disadvantages of prior analyzers by providing simple and effective means for assuring that the phase relationships between the current flowing in the dynamometer coils will remain accurately related to the phase of the current flowing in the test coil unit rather than to the voltage impressed thereon as heretofore. In brief, this is accomplished by utilizing the current flowing in the test coil circuit to generate the reference voltage used to provide the power supply for the two dynamometer instruments. More specifically, a plurality of current transformers have their primaries connected in series with the primary of the test coil, one group of these transformers serving to energize the amplifier with current of accurately known phase relationship to the reference voltage and another group operating to excite dynamometer measuring instruments with currents of accurately predetermined phase relationships.

In view of the foregoing factors and conditions characteristic of electrical analyzing devices for testing metals by the induced flux method, it is a primary object of this invention to provide an improved device of this character in which the phase of the exciting current for the measuring instruments is always accurately related to the phase of the current flowing in the test coil inductively associated with the specimen under inspection.

More specifically, it is an object of this invention to provide an analyzer utilizing the current flowing through the test coil unit to generate the reference voltage used to excite the field coils of the measuring instruments together with means for adjusting the phase relationships of the currents in each exciting coil with precision and in a manner required for accurate and reliable test results.

Efforts to provide high quality amplifiers in which components of the output signal bear substantially the same phase relationship to each other as the components of the input signal have been quite successful but are subject to certain errors not tolerable in a high precision analyzer. The present invention obviates the resulting disadvantages arising from these errors by providing an instrument adjustable to compensate accurately for the phase shift occurring in the amplifier between the signal voltage and the current flowing through the test coil circuit.

It is therefore a further object of this invention to provide an analyzer employing an amplifier for the signal voltage together with means for adjusting the dynamometer measuring instruments to compensate for phase shift errors occurring within the amplifier as the signal passes therethrough.

Another object of the invention is the provision of an electrical analyzer having means associated with the test coil circuit for generating a reference voltage from the current flowing in this circuit together with means for utilizing this reference voltage to excite the measuring instruments with currents which are in accurately adjusted phase relation with the current in the test coil.

These and other more specific objects will appear upon reading the following specification and claims upon considering in connection therewith the attached drawing to which they relate.

Referring now to the drawings, the single figure of the drawing is a schematic diagram of the electrical analyzer device comprising the present invention and having a metal specimen under test positioned in the test coil unit.

Referring to the drawing, the test coil unit designated generally 10 will be seen to comprise an inner primary coil 11 surrounded by a secondary coil 12, it being understood that this test coil unit 10 may be of any suitable type for use in testing metal specimens by the induced flux method. Test coil unit 10 is provided with a central opening for receiving a metal specimen such as that indicated by the iron rod 13. Primary coil 11 of the test unit is connected in series with the primaries 14, 15, 16 and 17 of high quality current transformers A, B, C and D, the opposite ends 18 and 19 of this circuit being connected to a suitable source 20 of alternating current of commercial voltage and frequency. The secondaries 21, 22, 23 and 24 of current transformers A, B, C and D, respectively, are similar and each has a central tap except secondary 21. It will be understood that the voltage induced in the secondary of each of the current transformers is always in phase with the current flowing in the primary windings and through the test coil unit. This secondary voltage is conveniently known as the reference voltage owing to this fixed relationship and is used in accurately calibrating the dynamometer measuring instruments and thereafter as the reference voltage for these instruments. Additionally, the reference voltage remains unaffected by changes in the phase of the power supply voltage.

The secondaries of transformers A and B are connected respectively to one pair of terminals of two double-pole, double-throw, three-position switches designated generally 25 and 26. It will be understood that the two movable switch arms 25', 25" of switch 25 are connected together for simultaneous movement, and that switch arms 26', 26" of switch 26 are likewise connected together for simultaneous movement. One pair of terminals of each switch is marked "For." and the other pair "Rev." and representing, respectively, the forward and reverse positions of the switches. Each switch also includes a pair of intermediate or neutral-position contacts connected to one another and positioned between the forward and reverse pairs of contacts. By moving the switch arms in contact with these neutral contacts the test coil 12 may be connected directly to the amplifier independently of transformer coils 21 and 22 for a purpose to be explained presently.

The in-phase transformer A has its secondary 21 connected by leads 28, 29 to the "For." terminals of switch 25, lead 29 having a movable contact shiftable along a non-inductive resistor 30 connected in shunt across the terminals of the transformer secondary 21. It will thus be clear that the voltage output of transformer A can be adjusted to any desired value.

The voltage induced in secondary coil 22 of current transformer B, similarly to transformer A, is in phase with the current passing through its primary coil 15. Since it is desired that the current supplied by coil 22 be in quadrature with the current flowing in the primary coil 15 and in the test coil unit 10, it is necessary to shift its phase with respect to the reference voltage. This 90 degree phase shift of the current output of coil 22 is obtained by a phase shifting network comprising a condenser 31 and a variable resistor 32 connected in series across the end terminals of coil 22. A conductor 33 is connected between the central tap of coil 22 and one of the "For." terminals of reversing switch 26, the other "For." terminal of this switch being connected to the moving contact of the non-inductive resistor 34 by a lead 35. It will be understood that variable resistor 32 is adjusted at the factory in accordance with well known techniques to provide an output current from transformer B through resistor 34 which is exactly in quadrature with the current passing through the primary. The purpose of the manually adjustable resistor 34 is similar to that of resistor 30, namely, to provide any desired voltage amplitude for introduction in the test coil secondary circuit.

Reversing switches 25 and 26 are connected in circuit with secondary 12 of test coil unit 10 and with the voltage amplifier unit 40 by suitable leads shown in the drawing. For example, one end of coil 12 is connected to the amplifier by lead 41 while the other end is connected by lead 42 to the fixed end of switch arm 26". The fixed end of switch arm 25' is connected by a lead 43 to the input of the amplifier, and is also preferably grounded as indicated at 44. A knife switch 45 has its opposite ends connected across leads 41, 42 of test coil 12 so that this coil may be short circuited for a purpose explained below. Referring again to switches 25 and 26 it will be noted that lead wires built into the bases of these switches serve to connect the "For." terminals of each to the "Rev." contacts at the opposite ends of these switches. Likewise another lead interconnects the two center contacts of each switch. Accordingly, it will be understood that by moving switch arms 25', 25" of switch 25 from the position illustrated to a position in contact with the "Rev." terminals, the voltage from secondary coil 21 of the transformer can be reversed with respect to the secondary of the test coil unit. The same is likewise true with respect to switch 26 and its associated coil 22.

Referring now to current transformers C and D, it will be seen that the output of transformer C is employed to excite the field coils of the in-phase dynamometer designated generally 50 while the output voltage of quadrature transformer D is used to excite the field coils of the quadrature-phase dynamometer designated generally 21. These two dynamometers represent the measuring instruments of the analyzer device, the measurements obtained on each being readily interpretable by one skilled in this art as indicating different physical and magnetic properties of the test specimen. In order that the phase relation of the secondary voltage with respect to the current passing through the primary circuit of the test coil unit may be accurately and precisely related to the voltage output of amplifier 40, each of secondary coils 23 and 24 are provided with a phase shifting network similar to that described in connection with the secondary of transformer B. The network for transformer C comprises a capacitor 52 connected in series with a factory-adjusted non-inductive resistor 53 across the end terminals of secondary 23. A lead 54 has its opposite ends connected respectively to the junction between capacitor 52 and resistor 53 and to the fixed dynamometer coil 55. A second lead 56 is connected between the other end of dynamometer coil 55 and the center tap of transformer coil 23.

The phase shifting network connected to coil 24 of transformer D is similar to that described above in connection with the in-phase transformer C, capacitor 57 being identical with capacitor 52 and variable resistor 58 being identical with resistor 53. Likewise the output leads 59 and 60 interconnect the same points of this network with the opposite ends of the fixed or field coil 61 of dynamometer 51.

The output signal of amplifier 40 is impressed upon movable coils 64 and 65, respectively, of dynamometer measuring instruments 50 and 51 by leads 62, 63, it being understood that these instruments are of well known conventional design having a pointer 66 rigid with the movable coil of each. Each of pointers 66 is movable over a scale 67 suitably calibrated in opposite directions from its central, zero-reading position.

*Calibration of the analyzer*

Calibration of the analyzer device to compensate for any phase shift errors introduced into the signal voltages while passing through amplifier 40 is accomplished in the following manner. First, the power supply to the test coil unit and to the primaries of transformers A, B, C and D is established by closing the circuit to the power supply 20. Likewise, the power supply for the amplifier is established and care is taken to have a metal specimen such as that indicated at 13 extending through the opening of the test coil unit 10 as the presence of the specimen affects the inductance of the test coil. If the amplifier did not introduce an error by shifting the phase of the signal voltage with respect to the current flowing in the test coil, the reference voltage from secondary coil 23 would be in phase with the voltage output from the amplifier, and dynamometer 50 would indicate the in-phase component of the signal voltage. Since a phase shift is usually introduced by the amplifier, the signal voltage is shifted in phase so that its in-phase component is out of phase with the exciting current for dynamometer 50 and an erroneous reading results. An exact compensating adjustment is obtained by applying a voltage of known phase relation to the amplifier input and adjusting resistor 53 until a proper indication is obtained on dynamometer 50. As described above, a reference voltage of known phase is available from the secondaries of the current transformers and this voltage may be impressed on the amplifier input, the precaution being taken to close switch 45 thereby short circuiting coil 12 of the test coil unit; it is then known that no part of the voltage supplied to the amplifier originates from the test coil unit. Switch 26 connected to the secondary of the quadrature transformer B is now moved to the off or neutral position in which switch arms 26', 26" are in contact with the center contacts of this switch thereby disconnecting transformer secondary 22 from the input to amplifier 40. By moving arms 25', 25" of switch 25 to the left as viewed in Figure 1 into contact with the "For." contacts of this switch, the sole input to amplifier 40 derives from secondary coil 21 of the in-phase transformer A and it is known with certainty that the voltage input to the amplifier is in phase with the current flowing in test coil unit 10. The variable resistor 53 in the phase shifting network of transformer C is adjusted until the deflection of needle 66 of dynamometer 50 is a maximum, the correctness of the adjustment being checked by inserting a quadrature voltage in the circuit. This latter step is accomplished by shifting switch arms 25', 25" of switch 25 to the off position, and by shifting the contact arms 26', 26" of switch 26 to the "For." position. No deflection should be observed in the needle of dynamometer 50 when this quadrature voltage is inserted. A further check is provided by shifting the arms of switch 26 to the reverse position and observing whether needle 66 changes position. If resistor 53 has been properly adjusted, no change will be detected since the voltage introduced from transformer B is in quadrature with the properly calibrated dynamometer 50.

The quadrature-phase dynamometer 51 is calibrated in a similar manner by impressing the reference voltage on the amplifier obtainable from transformer B by adjusting arms 26', 26" of switch 26 to their "For." position and arms 25', 25" of switch 25 to their neutral or off position. Thereafter variable resistor 58 in the network of the quadrature secondary is adjusted until needle 66 of dynamometer 51 deflects to a maximum, the proper adjustment being checked by first turning switch 26 to the off position and then turning the contact arm of switch 25 to both the forward and reverse positions and noting whether the needle of dynamometer 51 registers zero as it should if resistor 58 is correctly adjusted.

The instrument is now properly calibrated and resistors 53 and 58 may be sealed in their adjusted positions to discourage tampering by persons not skilled in their proper use. The operator may now proceed to employ the instrument to compare the physical properties of unknown specimens of metals with specimens of known properties in the usual manner with full assurance that the analyzer will remain in accurately adjusted phase calibration despite changes in the phase relationship of the power supply voltage with respect to the current in the test coil and the reference voltage. This assurance is based on the fact that in the present instrument the reference voltage for the measuring instruments 50 and 51 is generated by the current passing through the primary of the test coil. If there is a tendency for the current to fluctuate as the inductance of the test coil changes due to changes in the properties of the specimen being tested, such fluctuations may be stabilized satisfactorily by inserting a resistance 70 in the input circuit to the test coil.

*Operation*

Once the instrument has been fully calibrated as described above, it is ready for use. After the amplifier has reached a stable operating condition a calibrated metal specimen having known physical and magnetic properties is placed within the test coil unit and the short-circuiting switch 45 is opened. The cyclic current flowing through primary coil 10 will create a cyclically varying flux field which will traverse the specimen and induce eddy currents internally thereof of a character reflecting the properties of the material in a manner well known by those skilled in the art and as described in the aforementioned Irwin Patent 2,673,613. The flux field created within the specimen in turn induces a counterelectromotive force in secondary coil 12 of the test unit, the voltage so induced being characteristic of the flux field induced within the specimen itself. The instrument is now adjusted to the desired degree of balance by introducing voltage components to oppose both the in-phase and quadrature phase voltages to provide a proper input signal to the amplifier and to the two dynamometers. Resistor 30 is adjusted and switch 25 is moved to "For." or "Rev." positions to indicate on dynamometer 50 whether an opposing or an additive voltage to the in-phase voltage component of secondary coil 12 should be introduced to oppose the signal voltage, the switch being left in the position found to provide an opposing voltage. Resistor 30 is adjusted to the position providing a desired deflection of needle 66 on dynamometer 50, this deflection being carefully noted since it is to serve as the norm with which readings obtained from an unknown specimen will be compared. A similar procedure is followed in adjusting resistor 34, reversing switch 26 and quadrature phase dynamometer 51 in order to introduce a quadrature voltage component opposed to that induced in secondary coil 12. The instrument is now in readiness for the testing of unknown specimens.

The calibration specimen is now replaced with the unknown member 13 and the new readings of needles 66 on scales 67 of the two dynamometers are carefully noted. If both needles have the same deflection reading as with the calibration specimen in place in the test coil, the operator will know that the particular portion of the unknown specimen being traversed by the cyclic flux field from primary coil 11 has physical and magnetic properties identical with those of the calibration specimen. Usually, however, the needle of one or both dynamometers will be deflected to a different position and the value of this difference indicates to the operator the nature of the physical and magnetic properties of the test specimen relative to the corresponding known properties of the calibration specimen. As is well known to those skilled in this art, the in-phase dynamometer indicates variations in watt loss occasioned by eddy currents, these changes being an accurate measure of changes in the internal resistance intimately associated with the nature and extent of physical properties and fatigue conditions within the portion of the member 13 in the test zone. The quadrature dynamometers 51 measure the induced voltage components in quadrature with the current flowing in the test coil and is, for this reason, unaffected by changes measured by the in-phase dynamometer. Variations from the norm reading obtained with the calibration specimen are indicative of stresses and conditions of hardnesss or softness.

It will therefore be understood that the test continues by moving the test member 13 axially of test coil 10 as variations of the two dynamometer needles from their respective predetermined norm readings are noted. No changes are made in the adjustment of resistors 30 and 34 as this would change the "norm" position of needles 66 and destroy the reference point.

It will be evident from the foregoing that the analyzer device of this invention remains in true phase calibration irrespective of changes in phase relations of the current and voltage existing in the test coil relative to those of the power supply. The reason for this is that all the reference voltages required for the operation of that portion of the analyzer beyond the primary circuit of the test coil are generated by the current actually flowing through the test coil primary, rather than by the power supply voltage as heretofore.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In an analyzer device for determining properties of metals by the induced flux method, said device being of the type having test coil means adapted to be energized from an alternating current source to create a cyclic flux field through a portion of the test specimen and to have a counterelectromotive force induced in said coil means characteristic of properties of the specimen, a pair of dynamometers energized from said alternating current source and having movable coils responsive respectively to the in-phase and quadrature-phase components of said characteristic induced counterelectromotive force, and means for amplifying said in-phase and quadrature phase components; that improvement which comprises means for exciting the field coils of said dynamometers by energy derived from the energizing alternating current flowing in said test coil means, said last-named means including means to adjust the phase relation of the voltage impressed on said field coils with respect to the current flowing in said test coil means in a manner to compensate for phase shift in components of the signal as the latter passes through said amplifier means to the moving coils of said dynamometers.

2. In an electrical analyzer for determining the properties of metals, said analyzer being of the type having test coil means energized from an alternating current source to create a cyclic flux field within a metal specimen and operable to induce a characteristic voltage back into said coil means, means to oppose said induced voltage in major part, means to amplify the net portion of said induced voltage, means to impress the in-phase and quadrature components respectively of said amplified net voltage on the moving coils of a pair of dynamometers; that improvement which comprises providing means for exciting the field coils of said dynamometers from the same power source used to create said cyclic flux field, said last-mentioned means including a pair of current transformers having their primaries in circuit with said test coil means and their secondaries connected respectively to the field coils of a different one of said pair of dynamometers, the connections of said secondaries with said dynamometers including means by which the phase relations of the voltages impressed on said field coils can be accurately predetermined with respect to the current passing through said test coil means.

3. In combination, an electrical analyzer comprising test coil means adapted to be inductively associated with a metal specimen undergoing analysis and to be energized by an alternating current power source, a pair of measuring instruments coupled to said coil means and responsive to in-phase and quadrature phase voltage components respectively of the energizing current for said coil means, a pair of current transformers having their primaries connected in circuit with said test coil, and means including phase shifting networks connecting the secondaries of said transformers to said measuring instruments to excite the same, the exciting voltage for one of said instruments being in phase and that of the other instrument being in quadrature phase relation with the energizing current for said test coil means.

4. In combination, an electrical analyzer comprising test coil means adapted to be energized by alternating current and operable to create a cyclic flux field through a metal test specimen when so energized by alternating current, a plurality of measuring instruments connected in circuit with said test coil means and responsive respectively to in-phase and quadrature phase voltages induced in said coil means to indicate properties of a test specimen traversed by said cyclic flux field, means for exciting each of said measuring instruments inductively from the energizing alternating current flowing in said test coil means, said last-named means including separate phase shifting networks for each of said instruments having capacitor and resistor means therein adjustable to provide a voltage having a predetermined phase relationship to the current employed to energize the test coil means whereby the exciting voltage for each of said instruments can be maintained in predetermined phase relationship with respect to the energizing current for said test coil.

5. That improvement in the method of determining properties of metal specimens by induced flux which comprises, creating a cyclic flux field through the specimen by passing an alternating current through test coil means inductively associated with the specimen and inducing a voltage in said coil means characteristic of properties of the portion of the specimen traversed by said cyclic flux, opposing said induced voltage with in-phase and quadrature phase voltages maintained accurately in predetermined phase relation to the energizing current flowing through said coil means to provide relatively small net voltages, amplifying said net voltages, impressing the amplified net voltages on the moving coils of independent dynamometers, exciting the field coils of said dynamometers with currents and voltages maintained in predetermined phase relation with the energizing current flowing in said test coil means, and comparing variations in the readings obtained from said dynamometers as different areas of a test specimen are traversed by the cyclic flux field created in said test coil means.

6. In combination, an analyzing device for determining properties of metals by the induced flux method comprising, test coil means for producing a cyclic flux field through a metal specimen when said means is energized from an alternating current power source, pairs of in-phase and pairs of quadrature phase power source means connected in circuit with the current supply for said test coil means, a signal amplifier, means for feeding a signal to said amplifier from said test coil means, said signal comprising the net voltage induced in said coil means by said cyclic flux field in traversing a metal specimen after being substantially opposed by voltage components one of which is in phase and the other of which is in quadrature phase relation with the energizing current for said test coil means, said opposing voltage components being obtained from one of said pair of in-phase and quadrature phase power source means, a pair of measuring instruments each having a moving element and a fixed element, means for exciting the fixed elements of said instruments respectively from a different pair of said pairs of in-phase and quadrature phase power source means, and means for connecting the output of said amplifier to the moving elements of said measuring instrument.

7. An electrical analyzer for use in determining properties of metal specimens by the induced flux method comprising, test coil means adapted to be energized from an alternating current power supply and to have a voltage induced therein by a cyclic flux field traversing a metal specimen, a plurality of current transformers energized by the exciting current from said test coil, phase shifting means connected to the output side of said transformers for providing voltages of predetermined phase relation relative to the test coil exciting current, means utilizing in-phase and quadrature-phase voltages obtained from the output side of said transformers to oppose voltages induced in said test coil means to provide a relatively small net voltage, a pair of voltage comparator instruments, means for exciting said instruments respectively from a different pair of in-phase and quadrature-phase transformers, and means for impressing said net induced voltage on said voltage comparator instruments.

8. An electrical analyzer as defined in claim 7 including amplifier means for amplifying said net voltage from said test coil means before the same is impressed on said voltage comparator instruments, and means for adjusting the phase relation of the current and voltage employed to excite said voltage comparator instruments to compensate for phase shift produced on a signal passing through said amplifier.

9. An electrical analyzer for use in determining properties of metals by the induced flux method comprising, test coil means for creating a cyclic flux field when connected to an alternating current source and adapted to have a characteristic voltage induced therein as said flux field traverses a metal, means for opposing said induced voltage with a voltage of known phase relationship to the current employed to energize said coil means, said voltage opposing means including a pair of current transformers having their primaries in circuit with said test coil means and the power supply therefor, a variable resistor shunted across the secondary of one of said transformers, phase shifting means in circuit with the secondary of said second transformer including a variable resistor, and switching means connecting the output of said secondaries in circuit with the voltage induced in said test coil means in a manner opposing the voltage induced in said test coil means by a voltage of predetermined magnitude and phase relation relative to the energizing current for said test coil thereby providing a relatively small net voltage for use in a voltage comparator instrument.

10. An electrical analyzer instrument for use in determining properties of a metal specimen by the induced flux method comprising electrical circuits having operatively connected together therein the following components: test coil means for creating a cyclic flux field through the specimen as said coil means is energizing from an alternating current power source thereby inducing a voltage in said coil means characteristic of properties of the metal specimen traversed by the flux field, a pair of dynamometers for analyzing said induced voltage, and means for exciting said dynamometers respectively with voltages having a predetermined phase relation to the energizing current for said test coil means, said last-mentioned means including a pair of current transformers having their primaries in circuit with said test coil means and their secondaries connected to different ones of said dynamometers through independent phase shifting means.

11. An electrical analyzer instrument as defined in claim 10 wherein said phase shifting means includes a capacitor and a variable resistor in series across the transformer secondary and wherein the opposite ends of the dynamometer exciting means are connected respectively to the mid-point of one of said secondaries and to the connection between the capacitor and resistor of the phase shifting means associated therewith.

12. An electrical analyzer device for examining metal specimens comprising in combination the following components operatively electrically connected in circuit: test coil means adapted to be energized from an alternating current power supply to create a cyclic flux field through the specimen being examined and to have a voltage induced therein reflecting properties of the specimen, a pair of dynamometers for analyzing the in-phase and quadrature-phase components of said induced voltage and each having a moving coil and a fixed coil, means energized by the current flowing through said test coil means to generate adjustable voltage components of predetermined phase relation for opposing said induced voltage to provide a relatively small net voltage to be impressed on the moving coils of said dynamometers, and separate means energized by the current flowing through said test coil means to generate separate in-phase and quadrature-phase power supplies for the respective fixed coils of said dynamometers.

References Cited in the file of this patent

UNITED STATES PATENTS

| | | |
|---|---|---|
| 1,686,815 | Imes | Oct. 9, 1928 |
| 1,897,634 | De Forest | Feb. 14, 1933 |
| 2,290,330 | Irwin | July 21, 1942 |
| 2,673,613 | Irwin | Mar. 30, 1954 |
| 2,676,298 | Frommer | Apr. 20, 1954 |